(12) United States Patent
Carlson (10) Patent No.: US 11,186,144 B2
(45) Date of Patent: Nov. 30, 2021

(54) PRESSURE RELIEF ASSEMBLY HAVING A LIQUID-DIVERTING COVER

(71) Applicant: ILLINOIS TOOL WORKS INC., Glenview, IL (US)

(72) Inventor: Daniel David Carlson, Fenton, MI (US)

(73) Assignee: Illinois Tool Works Inc., Glenview, IL (US)

( * ) Notice: Subject to any disclaimer, the term of this patent is extended or adjusted under 35 U.S.C. 154(b) by 195 days.

(21) Appl. No.: 16/494,033

(22) PCT Filed: Mar. 19, 2018

(86) PCT No.: PCT/US2018/023076
§ 371 (c)(1),
(2) Date: Sep. 13, 2019

(87) PCT Pub. No.: WO2018/194776
PCT Pub. Date: Oct. 25, 2018

(65) Prior Publication Data
US 2020/0086716 A1    Mar. 19, 2020

Related U.S. Application Data

(60) Provisional application No. 62/488,127, filed on Apr. 21, 2017.

(51) Int. Cl.
B60H 1/24 (2006.01)
(52) U.S. Cl.
CPC .................. B60H 1/248 (2013.01)

(58) Field of Classification Search
CPC .......... B60H 1/249; B60H 1/24; B60H 1/248; B60H 1/26; F16K 15/031; F16K 15/035;
(Continued)

(56) References Cited

U.S. PATENT DOCUMENTS 2,770,833 A * 11/1956 Drechsel ............... F16K 1/2007
16/255
3,250,206 A * 5/1966 Strouth ............... F24F 13/1406
454/359

(Continued)

FOREIGN PATENT DOCUMENTS

CN      203580564 U    5/2014
CN      203937483 U    11/2014
(Continued)

OTHER PUBLICATIONS

International Search Report and Written Opinion for PCT/US2018/023076, dated Jun. 20, 2018.

*Primary Examiner* — Nivek K Shirsat
*Assistant Examiner* — Ko-Wei Lin
(74) *Attorney, Agent, or Firm* — Quarles & Brady LLP (57) ABSTRACT

A pressure relief assembly (100) is configured to be secured to a portion of a vehicle. The pressure relief assembly (100) includes a pressure relief device (102) and a liquid-diverting cover (104) including at least one liquid diversion vane (150) that defines at least one air outlet (152). The liquid diversion vane(s) (150) is configured to block liquid from passing into an interior cabin of the vehicle. The air outlet(s) (152) allows airflow from within the vehicle to pass out of the interior cabin of the vehicle.

19 Claims, 7 Drawing Sheets

(58) Field of Classification Search
CPC ........ F16K 15/16; F16K 15/144; F16K 15/10; A61M 2039/244; A61M 2039/2433; F04B 53/1037; F04B 39/1086; F04B 39/107
USPC .................. 137/855, 512.15; 454/162, 70
See application file for complete search history.

(56) References Cited

U.S. PATENT DOCUMENTS

| | | | | |
|---|---|---|---|---|
| 3,682,084 | A * | 8/1972 | Tarnoff | F24F 13/08 454/359 |
| 3,782,050 | A * | 1/1974 | Dowdell | F24F 13/08 52/473 |
| 4,103,468 | A * | 8/1978 | Olsen | F24F 13/08 52/473 |
| 4,781,106 | A * | 11/1988 | Frien | B60H 1/249 137/512.1 |
| 4,899,647 | A * | 2/1990 | Garries | E06B 7/02 454/277 |
| 5,080,005 | A * | 1/1992 | Kolt | F24F 7/00 454/194 |
| 5,105,849 | A | 4/1992 | Clough | |
| 5,662,522 | A * | 9/1997 | Waltz | E04D 13/17 454/359 |
| 5,727,999 | A | 3/1998 | Lewis | |
| 5,759,097 | A | 6/1998 | Bernoville et al. | |
| 5,904,618 | A | 5/1999 | Lewis | |
| 6,210,266 | B1 * | 4/2001 | Barton | B29C 45/1676 137/855 |
| 6,293,862 | B1 * | 9/2001 | Jafine | F24F 7/02 454/359 |
| 6,585,582 | B1 * | 7/2003 | Ziegler | B60H 1/26 2/DIG. 1 |
| 7,610,726 | B2 * | 11/2009 | Lajewski | F24F 7/00 52/97 |
| 8,651,924 | B1 * | 2/2014 | Jones | B64D 13/02 454/71 |
| 9,440,511 | B2 * | 9/2016 | Hofmann | B60H 1/248 |
| 2005/0003755 | A1 * | 1/2005 | Koessler | F24F 13/18 454/359 |
| 2005/0075064 | A1 * | 4/2005 | Omiya | B60H 1/249 454/162 |
| 2006/0025067 | A1 * | 2/2006 | Koessler | F24F 7/02 454/359 |
| 2007/0010191 | A1 * | 1/2007 | Vanden Bosch | F24F 7/00 454/359 |
| 2007/0184772 | A1 * | 8/2007 | McConnell | B60H 1/249 454/139 |
| 2008/0076344 | A1 * | 3/2008 | Flowerday | B60H 1/249 454/162 |
| 2009/0023379 | A1 * | 1/2009 | Bredahl | F24F 13/082 454/267 |
| 2011/0041930 | A1 * | 2/2011 | Kiezulas | F16K 15/035 137/527 |
| 2011/0230129 | A1 * | 9/2011 | Weber | B60H 1/249 454/162 |
| 2013/0052930 | A1 | 2/2013 | Hofmann et al. | |
| 2013/0267159 | A1 * | 10/2013 | McCarthy | B60H 1/249 454/162 |
| 2014/0057543 | A1 * | 2/2014 | Kim | B60H 1/26 454/165 |
| 2014/0323027 | A1 * | 10/2014 | Ide | F04D 25/14 454/119 |
| 2015/0321540 | A1 * | 11/2015 | Kim | B60H 1/3407 454/152 |
| 2016/0152114 | A1 * | 6/2016 | Yamamoto | F16K 15/031 454/162 |
| 2016/0193897 | A1 * | 7/2016 | Fiebiger | B60H 1/246 454/162 |
| 2018/0361827 | A1 * | 12/2018 | Carlson | F16K 15/144 |

FOREIGN PATENT DOCUMENTS

| | | |
|---|---|---|
| EP | 1818197 A1 | 8/2007 |
| EP | 1985480 A2 | 10/2008 |
| EP | 2050600 A2 | 4/2009 |
| JP | 20058126 A | 1/2005 |
| JP | 2005008126 A * | 1/2005 |

* cited by examiner

PRESSURE RELIEF ASSEMBLY HAVING A LIQUID-DIVERTING COVER

RELATED APPLICATIONS

This application represents the United States National Stage of International Application No. PCT/US2018/023076, filed Mar. 19, 2018, which claims priority to U.S. Provisional Patent Application No. 62/488,127, entitled "Pressure Relief Assembly Having a Liquid-Diverting Cover," filed Apr. 21, 2017, which are hereby incorporated by reference in their entirety.

FIELD OF EMBODIMENTS OF THE DISCLOSURE

Embodiments of the present disclosure generally relate to a venting or pressure relief device configured for use in an enclosed area, such as an automobile, and more particularly to a pressure relief device that is configured to divert liquid away from an interior of the enclosed area.

BACKGROUND

Interior cabins of vehicles typically include cabin vents or pressure relief devices. Without such devices, air pressure inside the vehicle cabin could damage occupants' ear drums. Further, when a vehicle door is closed, air pressure within the vehicle needs to be relieved or the door will not close. If an air bag is activated in a vehicle that does not have a venting or pressure relief device, an occupant's ear drums may be damaged.

Pressure relief devices are usually hidden from view. For example, a pressure relief device may be found in a trunk or on a body frame pillar structure. Each pressure relief device is adapted to allow air to pass out of an enclosed structure, while also preventing a significant amount of air, dust, water or other contaminants into the enclosed area. Thus, pressure relief devices are, in essence, one-way valves or one-way check valves, and are configured to maintain a small amount of back pressure per customer specifications. Pressure relief valves are shown and described in, for example, EP 2050600, U.S. Pat. Nos. 5,105,849, 5,759,097, 5,727,999, 5,904,618, and EP 1985480.

A conventional pressure relief device includes a plastic housing having a plurality of air passages. A light membrane (for example, a flap) is positioned over the air passages, and is configured to allow air to pass in one direction. In order to allow air to pass, the light membrane opens off of the main body in response to air flow. Typically, a seal is provided around the main body and acts to seal the hole in the mating structure upon assembly. The seal is typically molded around the main body in a secondary molding operation, or may be adhesively or chemically attached to the main body.

During installation, the pressure relief device may be snap fit to a structure. Typically, a user presses on the four corners of the pressure relief device in order to secure it within a reciprocal hole in a structure, such as a frame or sheet within a vehicle.

A pressure relief device may be located on a rear door of a vehicle. The pressure relief device may be located underneath a spare wheel that mounts to the rear door. As the vehicle backs up into an edge of a body of water (such as in order to back a boat on a trailer into the body of water), water may flow onto the pressure relief device, particularly if waves are present. The upsurge of water onto the pressure relief device may cause one or more flaps of the pressure relief device to slightly open, and some water may then pass into the interior of the vehicle.

In order to reduce the possibility of water infiltrating past the pressure relief device into an internal space, a separate water trough may be secured to a rear of the pressure relief device, such as through a snap fit connection. The trough collects the water that flows past the flaps. However, the trough may be susceptible to leaks when a sufficient amount of water is collected therein. Further, the trough may not be tall enough to block all water from infiltrating into the vehicle.

In order to prevent increased amounts of water infiltration, a shield having a trough may be clipped onto the rear of the pressure relief device. The shield extends to a higher level, and is able to block water at higher levels. However, the shield is typically a contiguous piece that blocks airflow, thereby reducing the effectiveness of the pressure relief device.

SUMMARY OF EMBODIMENTS OF THE DISCLOSURE

A need exists for systems and methods of preventing water from infiltrating past a pressure relief device into an interior cabin of a vehicle while at the same time allowing airflow through the pressure relief device.

With that need in mind, certain embodiments of the present disclosure provide a pressure relief assembly that is configured to be secured to a portion of a vehicle. The pressure relief assembly includes a liquid-diverting cover including at least one liquid diversion vane that defines at least one air outlet. The liquid diversion vane(s) is configured to block liquid from passing into an interior cabin of the vehicle. The air outlet(s) allows airflow from within the vehicle to pass out of the interior cabin of the vehicle. In at least one embodiment, the pressure relief device includes a plurality of liquid diversion vanes and a plurality of air outlets.

The pressure relief assembly also includes a pressure relief device. The liquid-diverting cover is secured to a rear of the pressure relief device. The pressure relief device may include a drainage trough. The liquid-diverting cover is configured to divert liquid into the drainage trough. As an example, the pressure relief device may include a housing that includes a plurality of air passage chambers that define airflow passages, and flaps secured in the air passage chambers over the airflow passages.

The liquid diversion vane(s) may be angled. For example, the liquid diversion vane(s) may inwardly angle towards a pressure relief device from an upper end towards a lower end.

In at least one embodiment, the liquid-diverting cover includes a frame that includes a base connected to lateral support walls and an upper ridge. The liquid diversion vane(s) extends between the lateral support walls.

The liquid-diverting cover may include an upper connection bracket including end connection beams that are configured to securely connect to reciprocal structures on a rear of a pressure relief device. For example, the reciprocal structures may include securing housings that are configured to snapably secure the pressure relief device to the portion of the vehicle.

The frame may include one or more upper air channels and/or lateral air channels. The frame may also include one or more hooks that are configured to secure onto a portion of a drainage trough of a pressure relief device.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a pressure relief assembly including a pressure relief device and a liquid-diverting cover that secures to a rear of the pressure relief device. The liquid-diverting cover includes a plurality of angled liquid diversion vanes that define a plurality of air outlets (such as below and behind the liquid diversion vanes). The vanes block water from passing into an interior cabin, while diverting the water into a trough, which allows the water to be drained out of the pressure relief assembly. The air outlets allow for air within the interior cabin to pass out of the pressure relief device.

Figure 1:
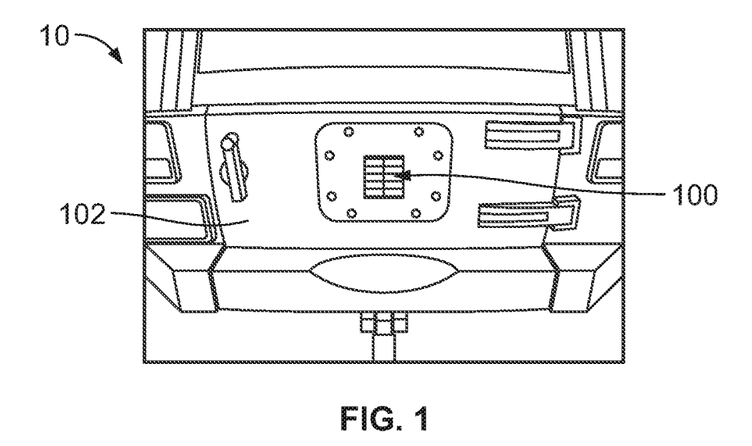
FIG. 1 illustrates a rear view of a vehicle having a pressure relief assembly, according to an embodiment of the present disclosure.

FIG. 1 illustrates a rear view of a vehicle 10 having a pressure relief assembly 100, according to an embodiment of the present disclosure. As shown, the pressure relief assembly 100 may be securely mounted to a rear tailgate 102 of the vehicle 10. The pressure relief assembly 100 may be configured to be covered by a spare wheel (not shown) secured to the rear tailgate 102.

Figure 2:
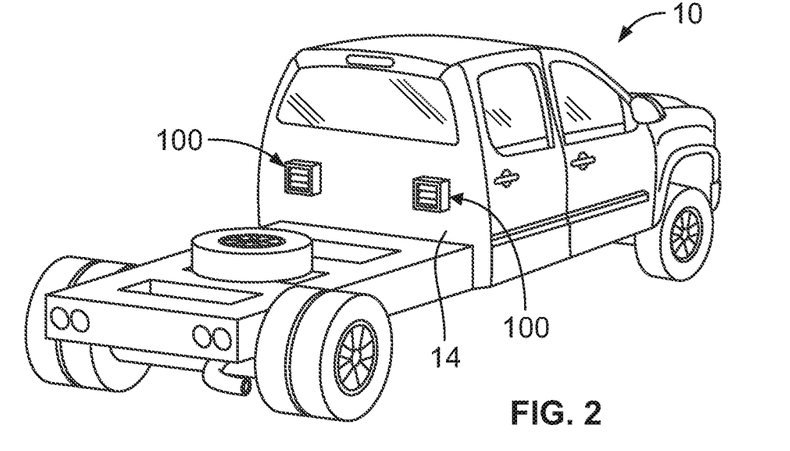
FIG. 2 illustrates a perspective rear lateral view of a vehicle having pressure relief assemblies, according to an embodiment of the present disclosure.

FIG. 2 illustrates a perspective rear lateral view of a vehicle 10 having pressure relief assemblies 100, according to an embodiment of the present disclosure. The pressure relief assemblies 100 may be securely mounted on and/or within a rear cabin wall 14 of the vehicle 10.

Figure 3:
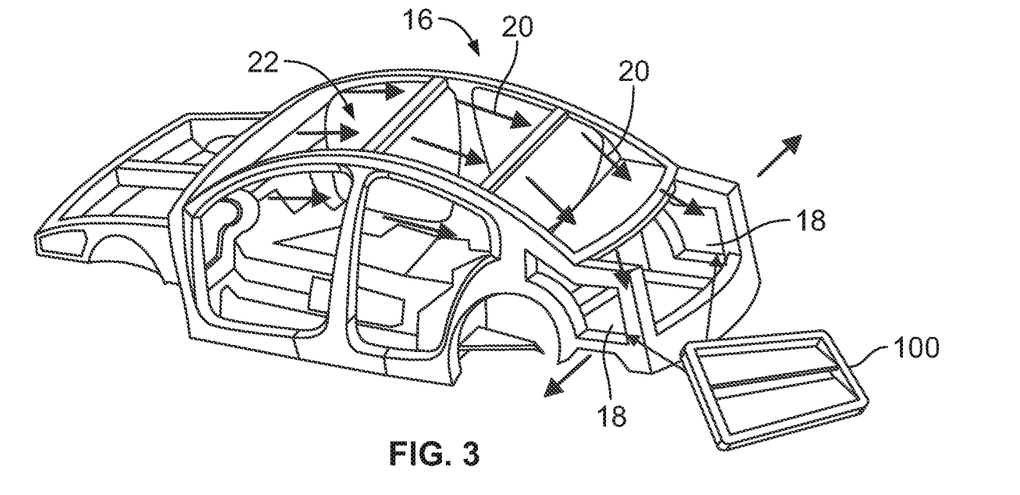
FIG. 3 illustrates a perspective top lateral view of a vehicle frame having locations for pressure relief assemblies, according to an embodiment of the present disclosure.

FIG. 3 illustrates a perspective top lateral view of a vehicle frame 16 having locations 18 for pressure relief assemblies 100, according to an embodiment of the present disclosure. As shown, the pressure relief assemblies 100 may be at rear locations 18 of the vehicle frame 16. Airflow 20 from within the internal cabin 22 passes out of the vehicle frame 16 via the pressure relief assemblies 100.

Figure 4:
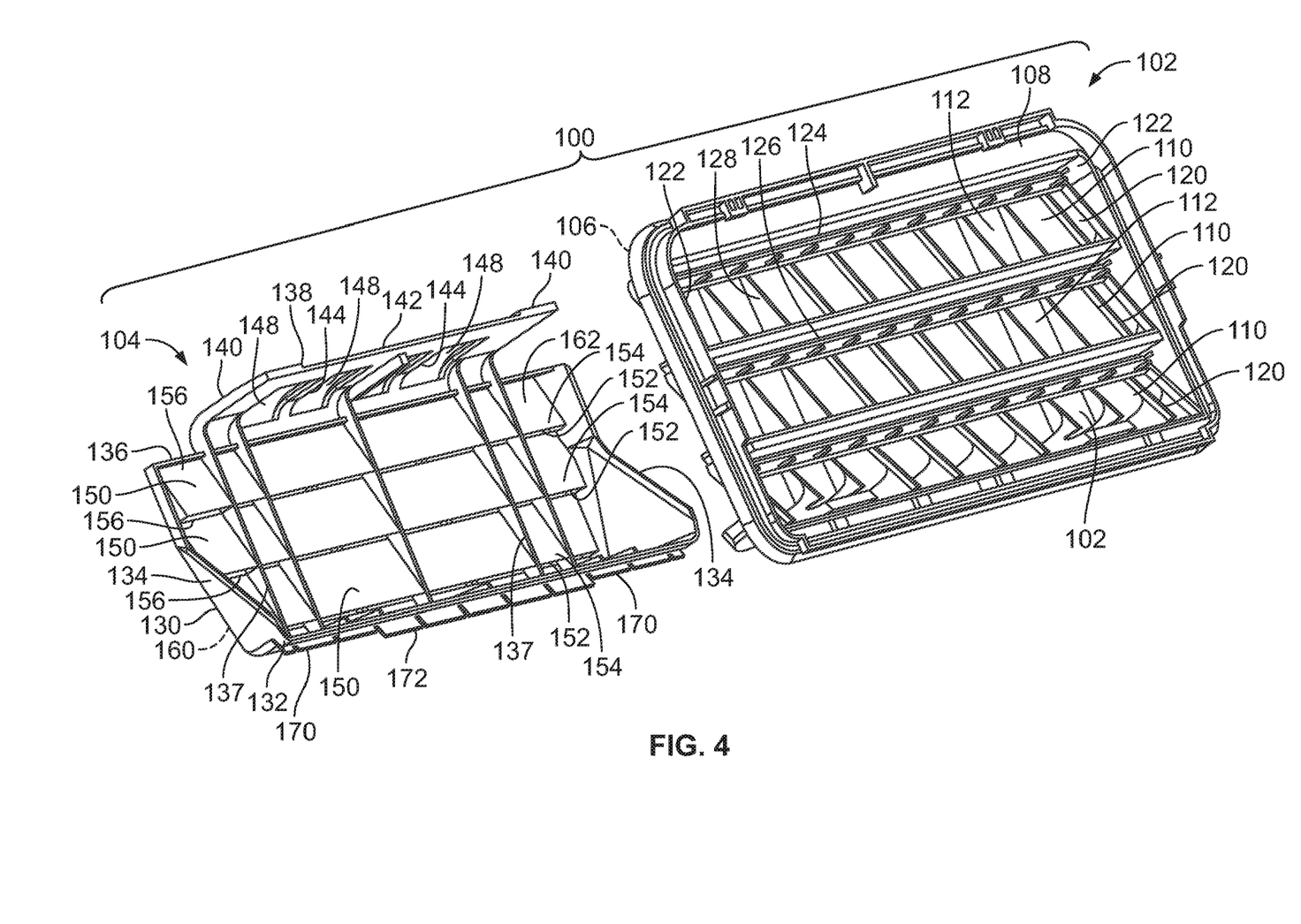
FIG. 4 illustrates a perspective front partially exploded view of a pressure relief assembly, according to an embodiment of the present disclosure.

FIG. 4 illustrates a perspective front partially exploded view of a pressure relief assembly 100, according to an embodiment of the present disclosure. The pressure relief assembly 100 includes a pressure relief device or valve 102 and a liquid-diverting cover 104 that secures to a rear 106 of the pressure relief device 102.

The pressure relief assembly 100 is configured to secure to a component, such as a panel of sheet metal of a vehicle, for example. The pressure relief assembly 100 secures into an opening formed through the panel. For example, the pressure relief assembly 100 may snapably secure into the opening formed through the panel.

The pressure relief device 102 includes a frame or housing 108 that includes a plurality of air passage chambers 110 that define airflow openings or passages 112. Flaps 120 are secured in the air passage chambers 110 over the airflow passages 112. In order to show underlying structure, the flaps 120 are shown as transparent structures. The pressure relief device 102 may include more or less air passage chambers 110 and flaps 120 than shown in FIG. 1.

Each air passage chamber 110 includes lateral walls 122 integrally connected to top and bottom walls 124 and 126, respectively. An air passage wall or beam 128 may extend between the lateral, top and bottom walls 122, 124, and 126, respectively. The airflow passages 112 are defined between the top and bottom walls 124, 126, the air passage beams 128, and the lateral walls 122. The lateral walls 122 may also be considered air passage beams. That is, the lateral walls 122 may be air passage beams. The air passage beams 122 may angle upwardly from the top wall 124 towards the bottom wall 126. The angle of the air passage beams 122 may vary based on a desired amount of flap resistive force.

The housing 108 may be formed of a hard plastic, such as acrylic. In at least one example, the housing 108 may be formed of injection-molded polypropylene. The housing 108 may be formed through a thermoforming process, which is generally an efficient and economical way of making various plastic devices. During the manufacturing process, a roll of plastic may be fed into a cavity, and then the plastic is formed using heat and pressure.

Instead of a plurality of air passage chambers 110, the housing 108 may include a single air passage chamber. Further, each air passage chamber 110 may define more or less airflow passages 112 than shown. For example, an air passage chamber 110 may define a single airflow passage 112. Also, optionally, the air passage beams 128 may be coplanar with a flat underside of the housing 108, instead of being angled.

In closed positions, the flaps 120 cover the airflow passages 112. Each flap 120 may be anchored to the housing 108 proximate to the top wall 124. For example, the flaps 120 may mount to the housing 108 through first attachments, such as connecting protuberances outwardly extending above the airflow passages 112. Each flap 120 may be a flexible membrane having channels formed proximate to an upper edge. The connecting protuberances may extend through the channels to secure the flaps 120 to the housing 108. The flaps 120 may be formed of a flexible thermoplastic elastomer, such as ethylene propylene diene monomer (EPDM) rubber, polypropylene, Hytrel, Lexan, Tyvac or Mylar, for example.

In at-rest positions, the flaps 120 cover the airflow passages 112. As air pressure builds and is exerted into undersides of the flaps 120, the flaps 120 pivot or otherwise flap open so that the airflow passages 112 are exposed, thereby allowing air to vent through the pressure relief assembly 100.

The liquid-diverting cover 104 includes a frame 130 that includes a base 132 connected to lateral support walls 134 and an upper ridge 136. A plurality of support struts 137 may extend from the base 132 to the ridge 136. The support struts 137 may be generally parallel to the lateral support walls 134 and perpendicular to the base 132 and the ridge 136. An upper connection bracket 138 inwardly extends from the ridge 136. As shown, the connection bracket 138 may extend above the ridge 136 and inwardly curve towards the rear 106 of the pressure relief device 102.

The connection bracket 138 includes end connection beams 140 that are configured to securely connect to reciprocal structures on the rear 106 of the pressure relief device 102. For example, the end connection beams 140 may be configured to snapably secure into reciprocal channels of the pressure relief device 102. A cross beam 142 may extend between the opposite end connection beams 140. The connection bracket 138 may also include support beams 144 that extend between the ridge 136 and the cross beam 142 between the opposed end connection beams 140. A plurality of enlarged upper air channels 148 are defined between the ridge 136, the end connection beams 140, the cross beam 142, and the support beams 144. Optionally, the connection bracket 138 may not include the support beams 144. Instead, a single, enlarged air channel 148 may be defined between the ridge 136, the end connection beams 140, and the cross beam 142. In at least one other embodiment, the connection bracket 138 may not include the cross beam 142.

The liquid-diverting cover 104 includes a plurality of angled liquid diversion vanes 150 that define air outlets 152 below lower ends 154. In at least one embodiment, the air outlets 152 extend behind and below the liquid diversion vanes 150. The liquid diversion vanes 150 extend across the liquid-diverting cover 104. For example, the liquid diversion vanes 150 extend between the lateral walls 134 and may generally be parallel to the base 132 and the upper ridge 136. The liquid diversion vanes 150 angle toward the pressure relief device 102 away from the ridge 136 from upper ends 156 towards the lower ends 154. That is, the liquid diversion vanes 150 inwardly angle from a rear surface 160 (facing away from the pressure relief device 102) towards a front surface 162 (facing the pressure relief device 102) from respective upper ends 156 towards respective lower ends 154.

As shown, the liquid diversion vanes 150 may correspond to the number of flaps 120 of the pressure relief device 102. In at least one embodiment, each liquid diversion vane 150 is configured to be positioned behind a corresponding flap 120. Optionally, the number of liquid diversion vanes 150 may not correspond to the number of flaps 120 of the pressure relief device 102. For example, the liquid-diverting cover 104 may include one or two liquid diversion vanes 150, instead of three. In at least one other embodiment, the liquid-diverting cover 104 may include four or more liquid diversion vanes 150.

A plurality of liquid diversion vanes 150 (instead of a single liquid diversion vane 150) provides a plurality of air outlets 152, instead of a large shielding wall that blocks airflow. In this manner, the numerous air outlets 152 provide numerous paths for air to flow into and out of the liquid-diverting cover 104, which thereby provides an efficient pressure relief assembly 100.

One or more hooks 170 and 172 may downwardly extend from the base 132. The hooks 170 are configured to securely hook onto an upper edge of a trough (hidden from view in FIG. 4) of the pressure relief device 102 to securely couple the lower portion of the liquid-diverting cover 104 to the pressure relief device 102. Alternatively, the liquid-diverting cover 104 may not include the hooks 170 and 172.

The liquid diversion vanes 150 block water from passing into an interior cabin of a vehicle, while diverting water into a drainage trough of the pressure relief device 102, thereby allowing the water to be drained out of the pressure relief assembly 100. The air outlets 152 allow for air within the interior cabin of the vehicle to pass out of the pressure relief device 102.

Figure 5:
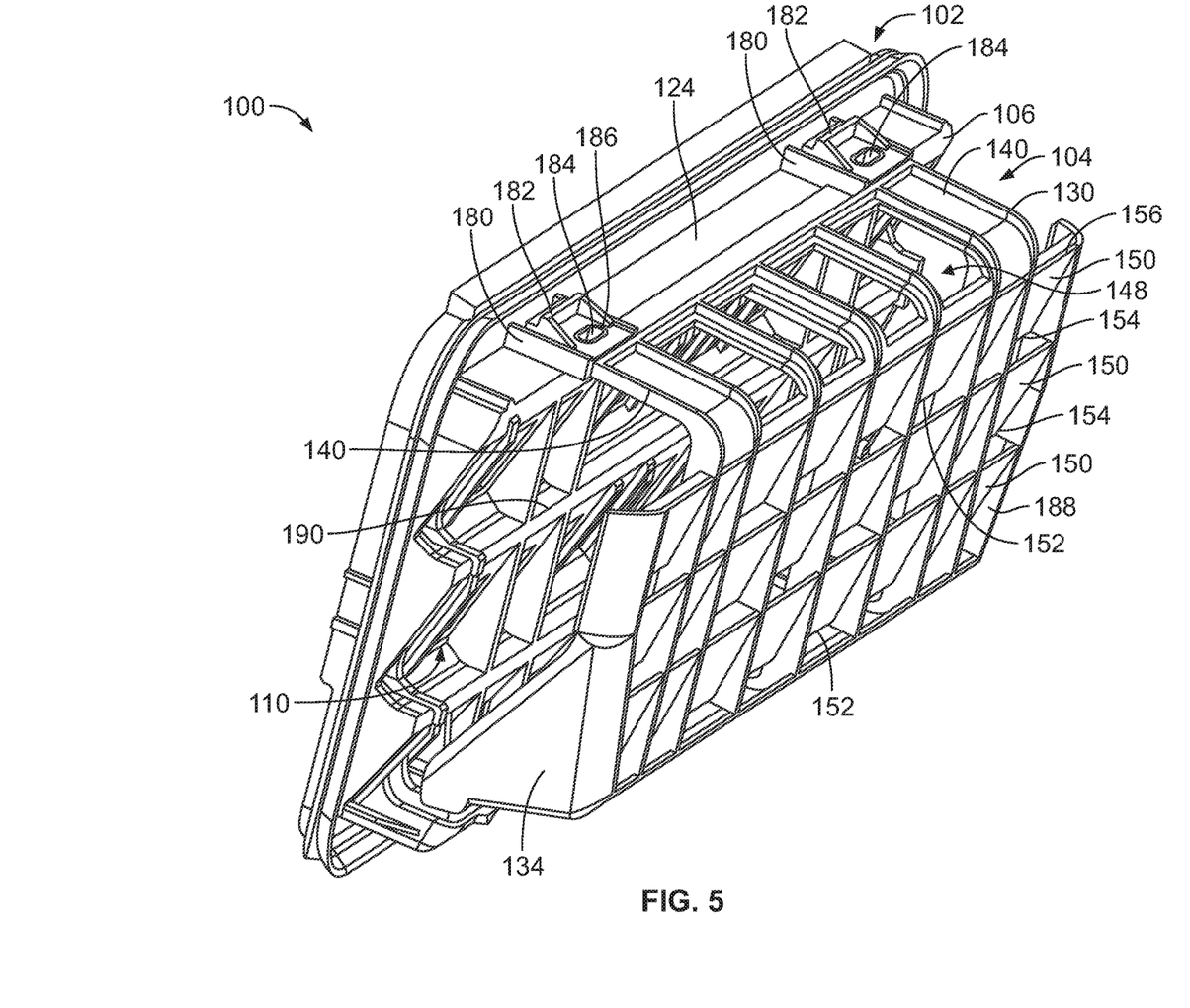
FIG. 5 illustrates a perspective top lateral view of a pressure relief assembly, according to an embodiment of the present disclosure.
Figure 6:
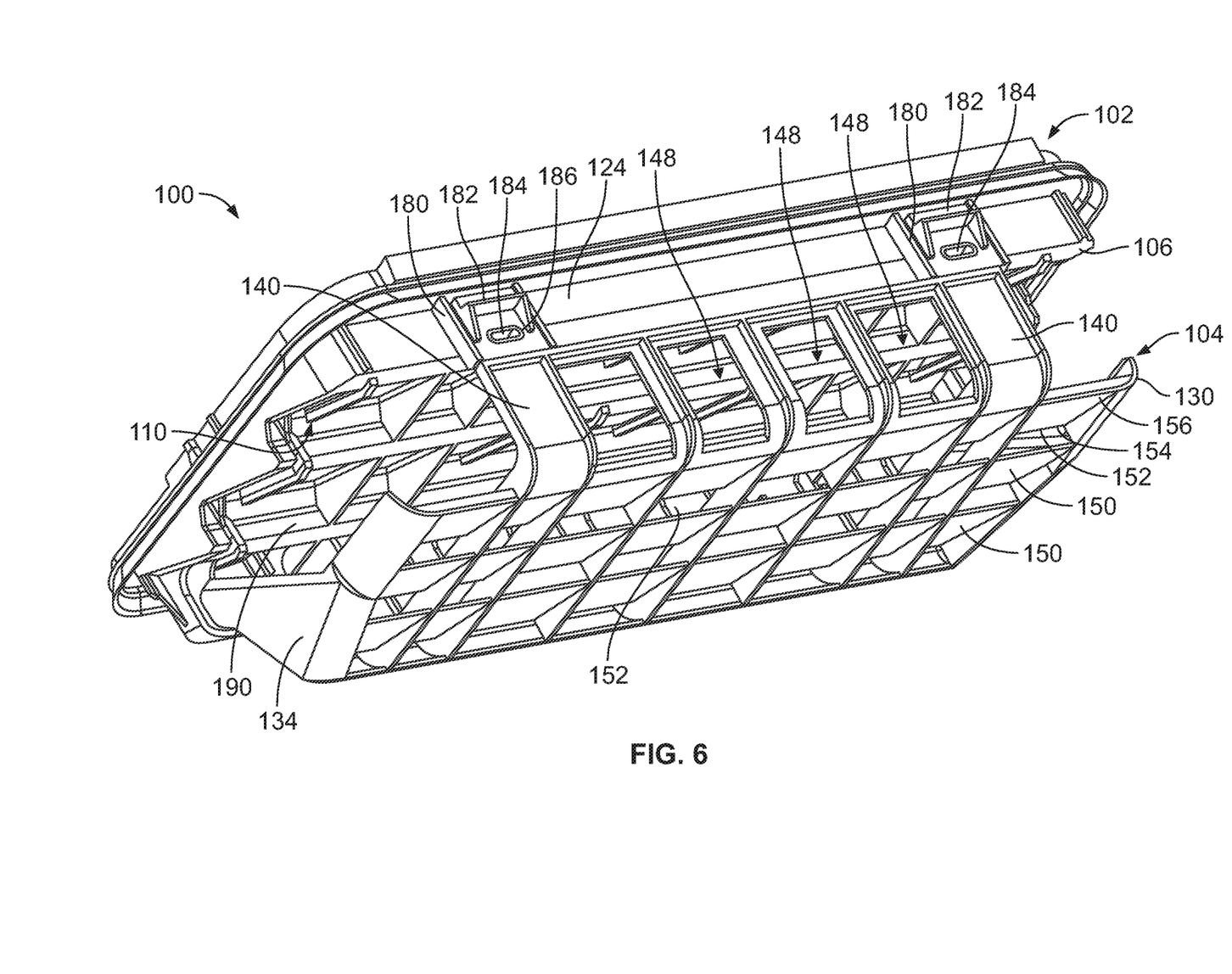
FIG. 6 illustrates a perspective top rear view of a pressure relief assembly, according to an embodiment of the present disclosure.

FIG. 5 illustrates a perspective top lateral view of the pressure relief assembly 100. FIG. 6 illustrates a perspective top rear view of the pressure relief assembly 100. Referring to FIGS. 5 and 6, the end connection beams 140 are configured to be inserted into securing housings 180 that outwardly extend from an uppermost top wall 124 of the pressure relief device 102, opposite from the air passage chamber 110. The securing housings 180 are configured to snapably secure the pressure relief device 102 into an opening of a panel, such as through securing ramps 182. Distal ends of the end connection beams 140 are moved into internal chambers of the securing housings 180. The distal ends of the end connection beams 140 include protuberances 184 that deflect into reciprocal openings 186 formed in the securing housings 180 to snapably secure the frame 130 of the liquid-diverting cover 104 to the pressure relief device 102.

As shown, the liquid diversion vanes 150 inwardly cant or angle from the rear surface 188 towards the pressure relief device 102 from upper ends 156 towards lower ends 154, thereby providing air outlets 152. The air outlets 152 and the air channels 148 provide a plurality of airflow paths through the liquid-diverting cover 104. Further, the lateral walls 134 may not connect entirely from bottom to top of the rear 106 of the pressure relief device 102. Instead, enlarged lateral air channels 190 are defined between the pressure relief device 102 and the liquid-diverting cover 104. The enlarged upper air channels 148 and lateral air channels 190 provide an enlarged airflow path between the pressure relief device 102 and the liquid-diverting cover 104. Moreover, the liquid diversion vanes 150 provide an open louver design that defines multiple airflow paths through the liquid-diverting cover 104.

The liquid-diverting cover 104 includes the plurality of angled liquid (splash) diversion vanes 150 and a plurality of air passages, such as the upper air channels 148, the lateral air channels 190, and the air outlets 152. The liquid diversion vanes 150 provide inboard liquid deflectors, while the various air passages allow air to flow out of an interior cabin of a vehicle.

Figure 7:
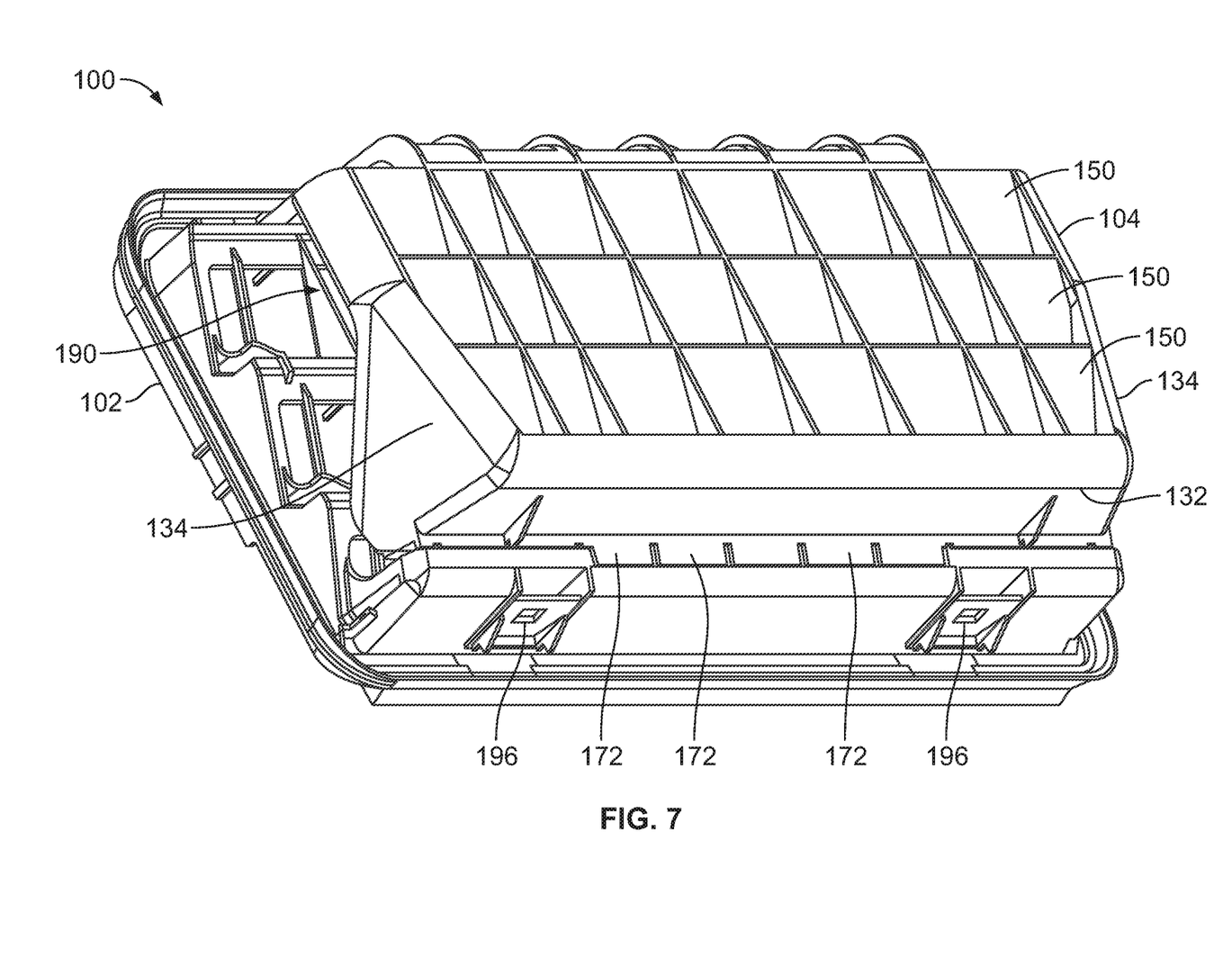
FIG. 7 illustrates a perspective bottom rear view of a pressure relief assembly, according to an embodiment of the present disclosure.
Figure 8:
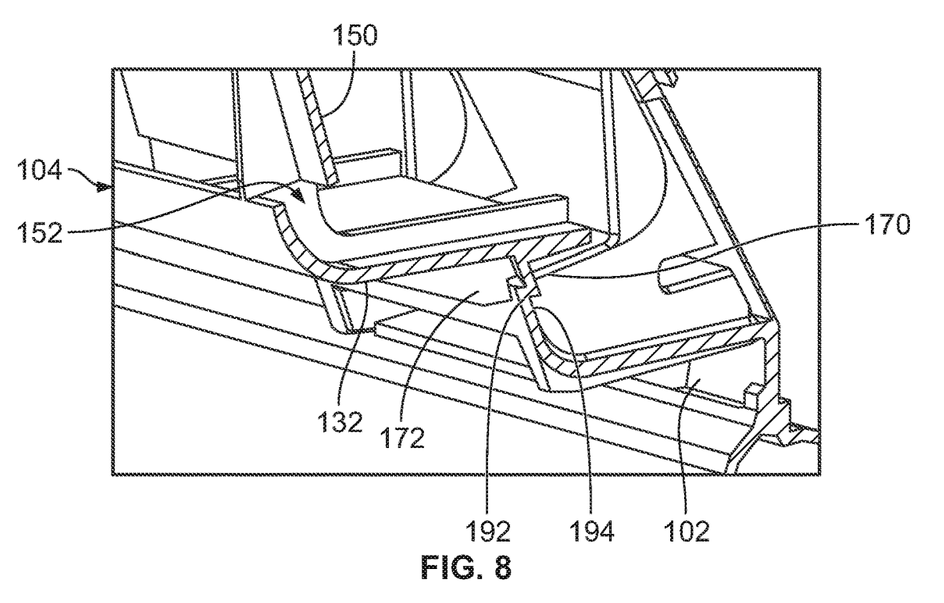
FIG. 8 illustrates a perspective, partial cross-sectional view of a base of a liquid-diverting cover secured to a trough of a pressure relief device, according to an embodiment of the present disclosure.

FIG. 7 illustrates a perspective bottom rear view of the pressure relief assembly 100, according to an embodiment of the present disclosure. FIG. 8 illustrates a perspective, partial cross-sectional view of the base 132 of the liquid-diverting cover 104 secured to a drainage trough 192 of the pressure relief device 100, according to an embodiment of the present disclosure. Referring to FIGS. 7 and 8, the hooks 170 and 172 may cooperate to securely hook the lower portion of the liquid-diverting cover 104 onto the trough 192. For example, the hooks 170 may be on a first side of an upper edge 194 of the trough 192, while the hooks 172 may be on a second side of the upper edge 194 opposite from the from first side.

In at least one other embodiment, the liquid-diverting cover 104 may include additional lower end connection beams. The lower end connection beams may be configured to snapably secure into lower securing housings 196 of the pressure relief device 102.

Figure 9:
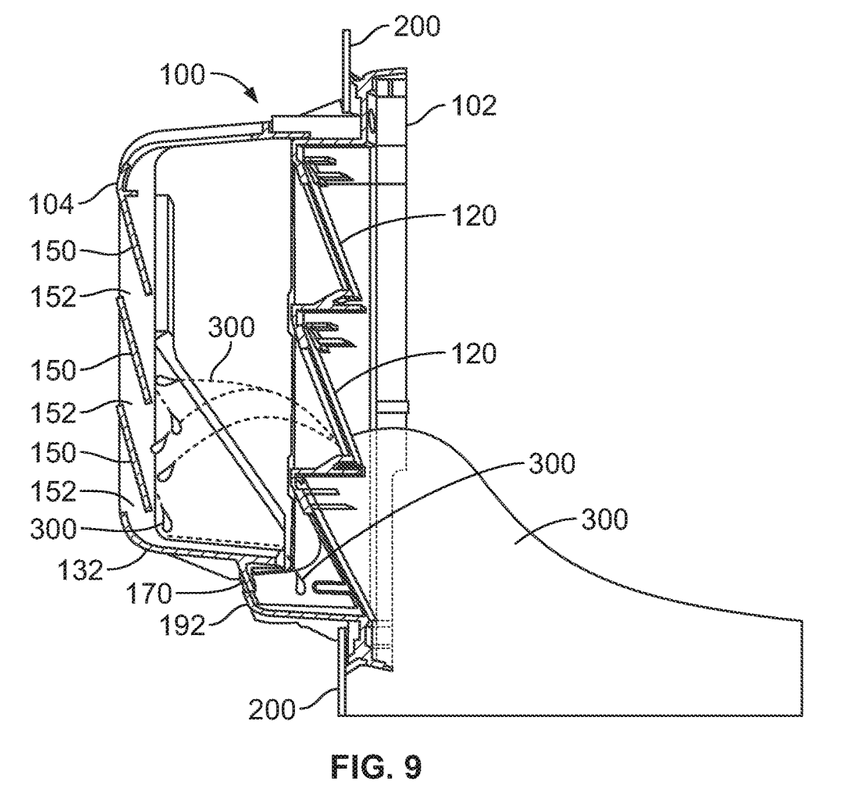
FIG. 9 illustrates a transverse cross-sectional view of a pressure relief assembly secured to a component having water splashing thereon, according to an embodiment of the present disclosure.

FIG. 9 illustrates a transverse cross-sectional view of the pressure relief assembly 100 secured to a component 200 having water 300 splashing thereon, according to an embodiment of the present disclosure. The component 200 may be a panel of sheet metal, for example. The component 200 may be a portion of a vehicle, such shown in FIGS. 1-3. As shown, the base 132 of liquid-diverting cover 104 provides a water diverting basin that connects to the trough 192 of the pressure relief device 102. As such, water 300 that passes into the base 132 is diverted into the trough 192 of the pressure relief device 102 (and ultimately drains out of the pressure relief assembly 100).

Figure 10:
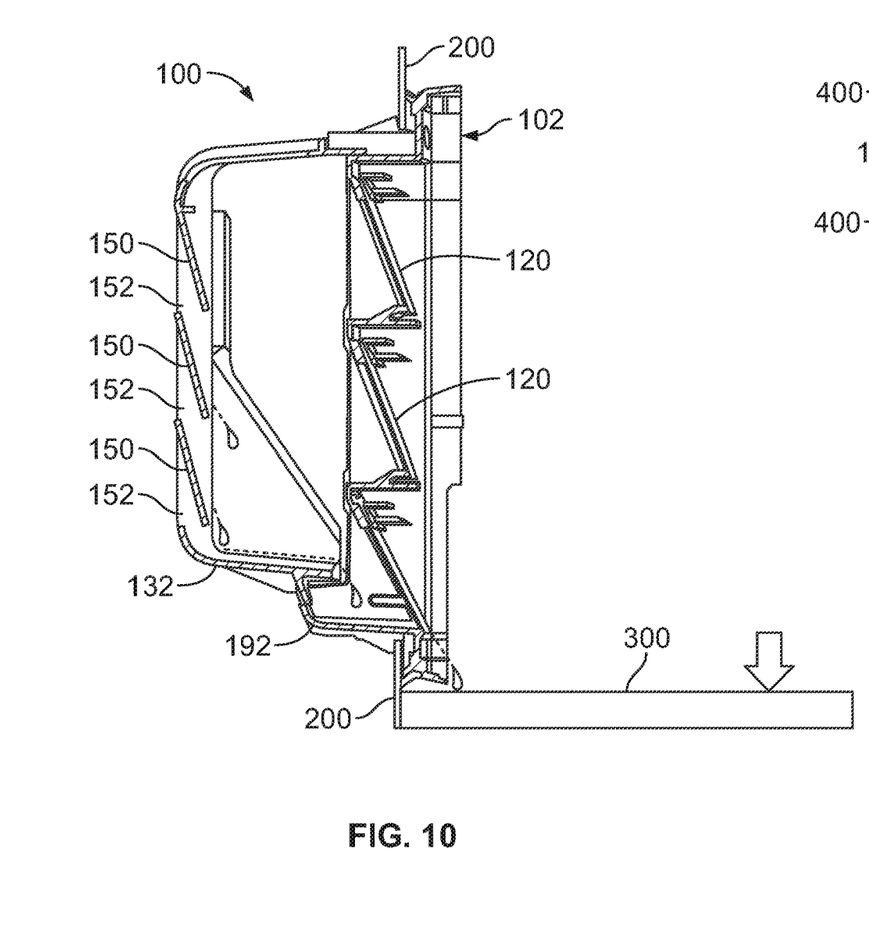
FIG. 10 illustrates a transverse cross-sectional view of a pressure relief assembly secured to a component with water receding thereon, according to an embodiment of the present disclosure.

FIG. 10 illustrates a transverse cross-sectional view of the pressure relief assembly 100 secured to the component 200 with water 300 receding thereon (as compared to FIG. 9). Referring to FIGS. 9 and 10, the water 300 may pass underneath one or more flaps 120. However, the angled vanes 150 block the water 300 from passing into an interior cabin of a vehicle, and direct the water 300 into the trough 192. The water 300 may then drain out of the trough 192 in a direction opposite from the interior cabin. The air outlets 152 underneath and behind the liquid diversion vanes 150 allow air within the interior cabin to pass through.

Figure 11:
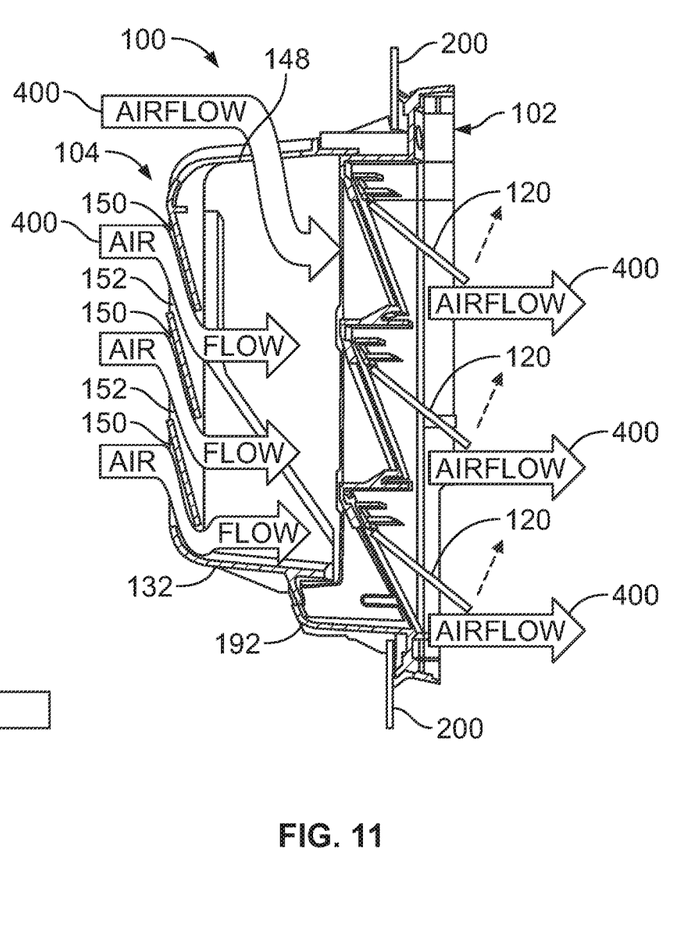
FIG. 11 illustrates a transverse cross-sectional view of a pressure relief assembly secured to a component and operating to allow airflow to flow therethrough, according to an embodiment of the present disclosure.

FIG. 11 illustrates a transverse cross-sectional view of the pressure relief assembly 100 secured to the component 200 and operating to allow airflow 400 to flow therethrough, according to an embodiment of the present disclosure. As shown, the airflow 400 passes through the various air passages, such as the air outlets 152, the upper air channels 148, and the lateral air channels 190 (shown in FIGS. 6 and 7). The airflow 400 is exerted into rear surfaces of the flaps 120, thereby causing the flaps 120 to deflect open, and allow the airflow 400 to pass out of the pressure relief assembly 100.

As described herein, embodiments of the present disclosure provide a liquid-diverting cover that is configured to securely couple to a rear (inboard side) of a pressure relief device. The liquid-diverting cover includes a plurality of angled vanes that block liquid from passing into an interior cabin of a vehicle, and divert the liquid into a drainage trough. Airflow passages are positioned underneath and/or behind the vanes, and allow air to pass from the interior cabin and out of the pressure relief device.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A pressure relief assembly that is configured to be secured to a portion of a vehicle, the pressure relief assembly comprising:
   a liquid-diverting cover including at least one liquid diversion vane that defines at least one air outlet, wherein the at least one liquid diversion vane is configured to block liquid from passing into an interior cabin of the vehicle, wherein the at least one air outlet allows airflow from within the vehicle to pass out of the interior cabin of the vehicle, wherein the liquid-diverting cover further includes a frame having a base and an upper ridge connected by lateral support walls, and wherein the at least one liquid diversion vane extends between the lateral support walls; a pressure relief device, wherein the liquid-diverting cover is secured to a rear of the pressure relief device.

2. The pressure relief assembly of claim 1, wherein the at least one liquid diversion vane comprises a plurality of liquid diversion vanes, and wherein the at least one air outlet comprises a plurality of air outlets.

3. The pressure relief device of claim 1, wherein the pressure relief device includes a drainage trough, wherein the liquid-diverting cover is configured to divert liquid into the drainage trough.

4. The pressure relief assembly of claim 1, wherein the pressure relief device comprises:
   a housing that includes at least one air passage chamber that defines one or more airflow passages; and
   a flap secured over each of the one or more airflow passages.

5. The pressure relief assembly of claim 1, wherein the at least one liquid diversion vane is angled relative to a rear surface of the pressure relief device.

6. The pressure relief assembly of claim 1, wherein the at least one liquid diversion vane inwardly angles towards the pressure relief device from an upper end of the at least one liquid diversion vane towards a lower end of the at least one liquid diversion vane.

7. The pressure relief assembly of claim 1, wherein the frame further comprises an upper connection bracket including end connection beams that are configured to securely connect to reciprocal structures on a rear of the pressure relief device.

8. The pressure relief assembly of claim 7, wherein the reciprocal structures comprise securing housings that are configured to snapably secure the pressure relief device to the portion of the vehicle.

9. The pressure relief assembly of claim 8, wherein the frame further comprises one or more upper air channels.

10. The pressure relief assembly of claim 8, wherein the frame further comprises lateral air channels.

11. The pressure relief assembly of claim 8, wherein the frame further comprises one or more hooks that are configured to secure onto a portion of a drainage trough of the pressure relief device.

12. The pressure relief assembly of claim 1, wherein the frame further includes a plurality of support struts extending from the base to the upper ridge and the at least one liquid diversion vane extends between at least one of the lateral support walls and at least one of the plurality of support struts.

13. A pressure relief assembly that is configured to be secured to a portion of a vehicle, the pressure relief assembly comprising:
   a pressure relief device; and
   a liquid-diverting cover secured to a rear of the pressure relief device, wherein the liquid-diverting cover includes a plurality of liquid diversion vanes that define a plurality of air outlets, wherein the plurality of liquid diversion vanes are angled relative to a rear surface of the pressure relief device, wherein the plurality of liquid diversion vanes are configured to block liquid from passing into an interior cabin of the vehicle, wherein the plurality of air outlets allow airflow from within the vehicle to pass out of the interior cabin of the vehicle, wherein the liquid-diverting cover further includes a frame having a base and an upper ridge connected by lateral support walls, and wherein the at least one liquid diversion vane extends between the lateral support walls.

14. The pressure relief assembly of claim 13, wherein the pressure relief device includes a drainage trough, wherein the liquid-diverting cover is configured to divert liquid into the drainage trough.

15. The pressure relief assembly of claim 13, wherein the pressure relief device comprises:
   a housing that includes at least one air passage chamber that defines one or more airflow passages; and
   a flap secured over each of the one or more airflow passages.

16. The pressure relief assembly of claim 13, wherein the plurality of liquid diversion vanes inwardly angle toward the pressure relief device from an upper end of the at least one liquid diversion vane towards a lower end of the at least one liquid diversion vane.

17. The pressure relief assembly of claim 13, wherein the frame further comprises:
   one or more upper air channels; and
   lateral air channels.

18. The pressure relief assembly of claim 17, wherein the frame further comprises an upper connection bracket including end connection beams that are configured to securely connect to reciprocal structures on a rear of a pressure relief device, wherein the reciprocal structures comprise securing housings that are configured to snapably secure the pressure relief device to the portion of the vehicle.

19. The pressure relief assembly of claim 17, wherein the frame further comprises one or more hooks that are configured to secure onto a portion of a drainage trough of the pressure relief device.

* * * * *